W. H. GAVIN.
OPERATOR'S SEAT FOR CANNERY TABLES.
APPLICATION FILED JAN. 12, 1920.

1,344,940.

Patented June 29, 1920.

WITNESS
Wm F. Drew

INVENTOR
William H. Gavin
BY Booth & Booth
ATTORNEYS

UNITED STATES PATENT OFFICE.

WILLIAM H. GAVIN, OF SANTA CLARA, CALIFORNIA, ASSIGNOR TO PRATT-LOW PRESERVING CO., OF SANTA CLARA, CALIFORNIA, A CORPORATION OF CALIFORNIA.

OPERATOR'S SEAT FOR CANNERY-TABLES.

1,344,940.   Specification of Letters Patent.   Patented June 29, 1920.

Application filed January 12, 1920. Serial No. 350,755.

*To all whom it may concern:*

Be it known that I, WILLIAM H. GAVIN, a citizen of the United States, residing at Santa Clara, in the county of Santa Clara and State of California, have invented certain new and useful Improvements in Operators' Seats for Cannery-Tables, of which the following is a specification.

My invention relates to operators' seats adapted to be associated with work-tables of the type usually used in canneries.

The objects of my invention are to provide a seat which is attached to the table at which the operator works, but which can be quickly moved out of the way beneath said table; which, further, is adjustable as to position, height, and tilt; and which has associated with it a rest for the operator's feet.

Although my invention is herein described and illustrated in its preferred form for use in canneries, it is to be understood that it is not so limited, but may be used as a seat in association with any work-table, or in any case in which a seat attached to a table is used or desired.

With this in view, my invention will now be described in detail with reference to the accompanying drawings, wherein—

Figure 1:
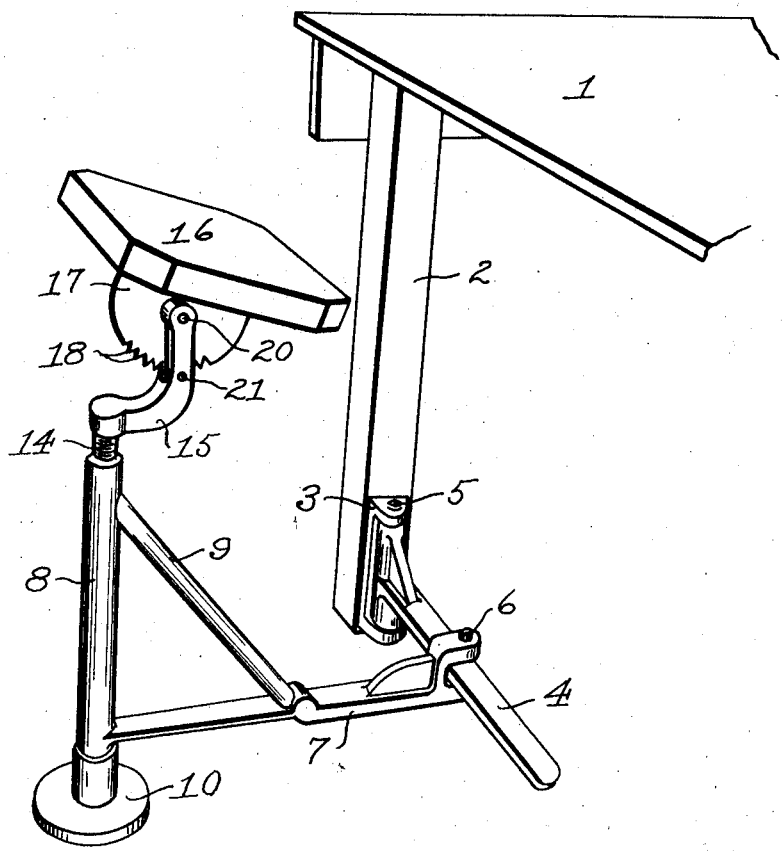
Figure 1 is a perspective view showing my seat in its relation to a work-table.

In the drawings, and referring particularly to Fig. 1 thereof, the reference numeral 1 designates a work or other table, which is open underneath from the front, and has a leg or support 2 somewhat to one side of the position normally occupied by the operator. A bracket 3 is secured to the side of said leg near its bottom, and said bracket carries a horizontal foot rest 4 pivotally mounted by means of a pin 5. Extending outwardly from the foot rest 4, and pivotally connected therewith, as at 6, is an arm 7 which is secured to the seat supporting column 8, and preferably further secured thereto, for rigidity, by a diagonal brace 9.

Figure 2:
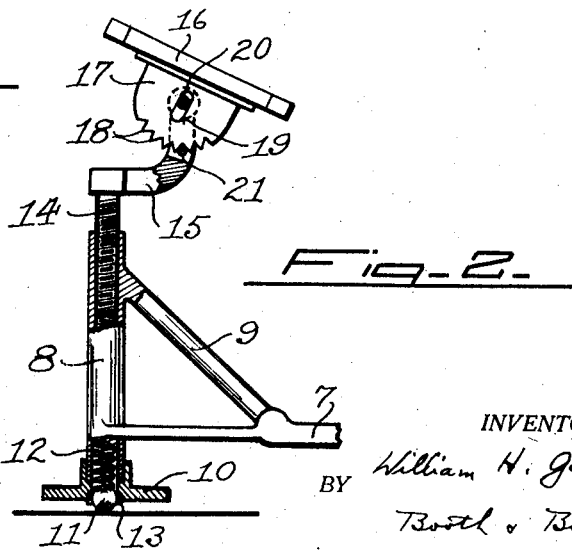
Fig. 2 is a part sectional elevation of my seat and its supporting member and base.

The seat column 8 has an enlarged base 10 with a flat under surface in the center of which is positioned a ball caster 11, Fig. 2, backed by a spring 12. Said spring is of sufficient strength to support the weight of the column and seat when unoccupied, so that the base 10 is raised off the floor. The seat thus rests upon the ball caster 11, and can be easily moved about, but when the weight of an occupant is added to that of the seat, the spring 12 is compressed, and the base 10 rests firmly upon the floor. A rim or flange 13 is provided to keep the ball 11 from dropping out of its socket if the base should be raised.

The upper portion of the seat column 8 is interiorly threaded to receive a threaded seat-shaft 14, to the upper end of which is secured an offset seat supporting bracket 15. The seat 16 has secured to its under side a perpendicularly disposed arcuate ratchet plate 17 having teeth 18 formed upon its arc, and a slot 19, perpendicular to the plane of the seat, positioned at the approximate center of its arc. The supporting bracket 15 is bifurcated at its upper end portion to receive the ratchet plate 17, and has a fixed pin 20 adapted to project through the slot 19 to form a pivotal support for the seat 16, and a second pin 21 adapted to be engaged by the ratchet teeth 18. On account of the slot 19, the seat 16 may be raised sufficiently, relatively to the support 15, to free the ratchet teeth 18 from the pin 21, to permit the tilting of the seat to any desired angle. When the seat is again lowered, the engagement of the ratchet teeth 18 with the pin 21 locks said seat at the desired angle.

The seat is thus instantly adjustable as to tilt, and is adjustable as to height by screwing the shaft 14, with the seat attached, in or out of the column 8. Moreover, the entire seat structure may be moved to any desired position relative to the table 1, and, when not in use, can be pushed entirely out of the way beneath said table. At the same time, the seat is always attached to the table, and cannot be taken away therefrom except by intentional disconnection. Finally, in use, the member 4 provides a convenient and satisfactory foot-rest.

I claim :—

An operator's seat for work-tables comprising a supporting member having a base; a foot-rest pivotally connected with a leg of an associated table for movement in a horizontal plane; a pivotal connection between said supporting member and said foot-rest, adapting said member to swing in a horizontal plane; a seat-carrying bracket mounted on said supporting member and vertically adjustable with respect thereto; a tiltable seat carried by said bracket; and means for locking said seat in angular relation to said bracket.

In testimony whereof I have signed my name to this specification in the presence of two subscribing witnesses.

WILLIAM H. GAVIN.

Witnesses:
F. P. PIORM,
J. A. KRELING.